United States Patent
Hosokawa et al.

[15] 3,665,768
[45] May 30, 1972

[54] DEVICE OF MEASURING FLUID CHARACTERISTIC OF POWDERED OR GRANULAR MATERIALS

[72] Inventors: Masuo Hosokawa; Tohei Yokoyama; Kiyoshi Urayama, all of Osaka, Japan

[73] Assignee: Kabushiki Kaisha Hosokawa Funtaikogaku Kenkyusho, Osaka, Japan

[22] Filed: Nov. 10, 1970

[21] Appl. No.: 88,460

[52] U.S. Cl. ............................................................73/432 R
[51] Int. Cl. .......................................................G01n 33/00
[58] Field of Search......................................73/432 R, 432 PS

[56] References Cited

UNITED STATES PATENTS

| 2,633,027 | 3/1953 | Bunnell | 73/432 R |
| 3,345,880 | 10/1967 | Boenisch | 73/432 R |
| 3,376,753 | 4/1968 | Pitkin et al. | 73/432 R |

FOREIGN PATENTS OR APPLICATIONS

| 1,173,139 | 10/1955 | France | 73/432 |

*Primary Examiner*—S. Clement Swisher
*Attorney*—Eugene E. Geoffrey, Jr.

[57] ABSTRACT

A device for measuring characteristics of powdered and granular materials which includes apparatus for measuring the angle-of-repose, cohesiveness, aerated bulk density, packed bulk density, angle-of-spatula, dispersability, and angle-of-fall.

1 Claim, 12 Drawing Figures

Patented May 30, 1972    3,665,768

INVENTORS
MASUO HOSOKAWA
TOHEI YOKOYAMA
KIYOSHI URAYAMA
BY
ATTORNEY

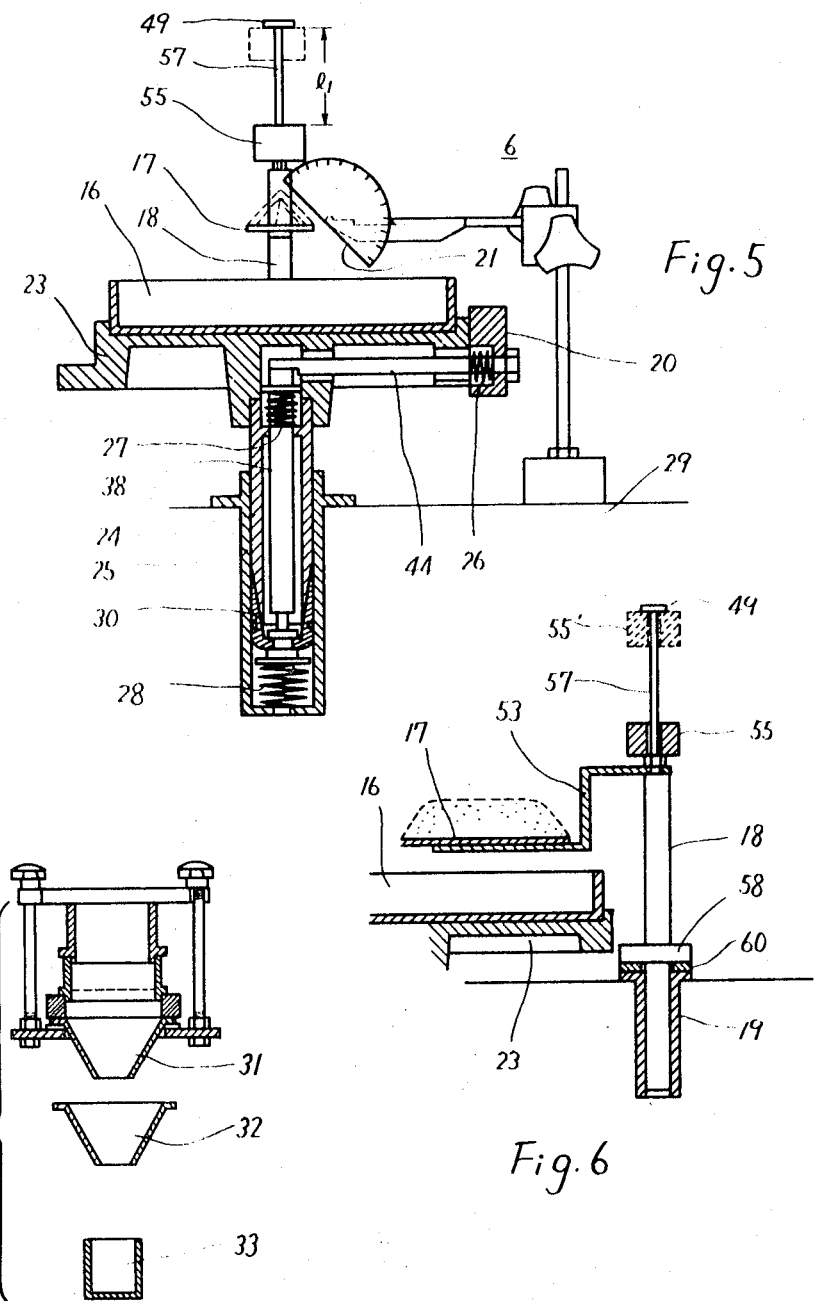

Patented May 30, 1972

INVENTORS
MASUO HOSOKAWA
TOHEI YOKOYAMA
KIYOSHI URAYAMA
BY
ATTORNEY 3,665,768

DEVICE OF MEASURING FLUID CHARACTERISTIC OF POWDERED OR GRANULAR MATERIALS

This invention relates to a measuring device for expressing numerically fluid characteristics of powdered or granular materials.

Measurement of fluid characteristics of powdered or granular materials is an important factor in planning and design of powder processing devices such as containers, feeders, transporting equipment and packing devices, and in quality control of powdered or granular products. In prior devices, however, though an angle of repose, bulk density, slide angle and the like have been measured manually or by individual devices, the methods of such measurements were conflicting and it has been difficult to express the measured values in common form.

Therefore, one object of this invention is to propose a compact measuring device which includes therein respective measuring units for the main factors of fluid characteristics of powdered or granular material and can measure these factors mechanically without introducing manual errors.

The main factors defining the fluid characteristic of powdered material are considered to be angle of repose, angle of fall, cohesiveness, aerated bulk density, angle of spatula, packed bulk density, and dispersability. The measuring device according to this invention is provided with respective measuring units for all of these factors compactly, driven by a common prime mover.

Other features and operations of this invention will be best understood from reading the following description with reference to the accompanying drawings.

In the drawings:

FIG. 5 is a front view in partial section illustrating an angle of spatula measuring unit of the device according to this invention;

FIG. 6 is a fragmentary sectional side view of the unit of FIG. 5;

FIG. 7 is a front view in partial section illustrating an aerated bulk density measuring unit of the device according to this invention;

Throughout the drawings like reference numerals are used to denote corresponding structural components in the several figures.

Figures 1, 2:
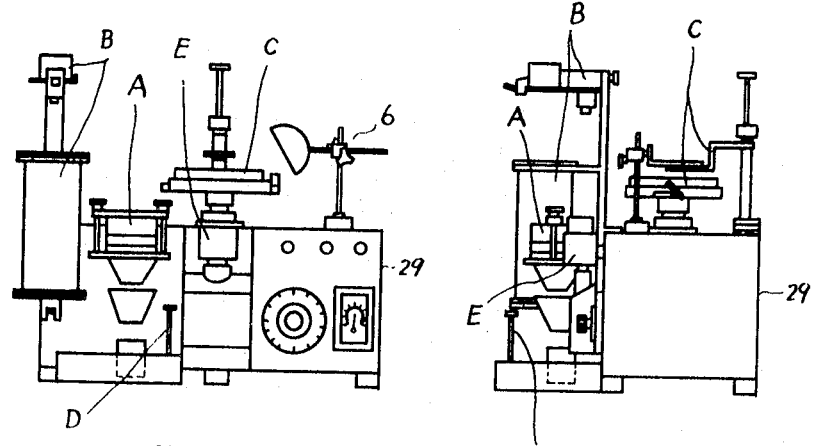
FIG. 1 is a front view representing an embodiment of a device according to this invention.
FIG. 2 is a side view of the device of FIG. 1.
Figures 3, 4:
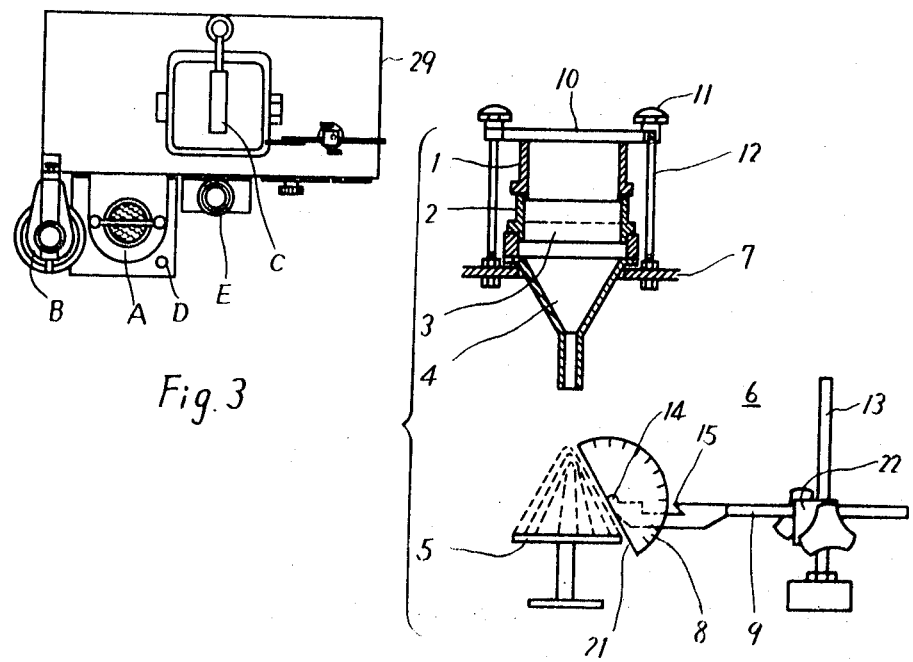
FIG. 3 is a plan view of the device of FIG. 1.
FIG. 4 is a front view in partial section illustrating an angle of repose measuring unit of the device according to this invention.

Referring to FIGS. 1, 2, and 3 which give an over-all representation of the measuring device of this invention, a single table or bed 29 containing a driving mechanism and controls is provided with a unit A for measuring an angle of repose, aerated bulk density and cohesiveness, a unit B for measuring dispersability, a unit C for measuring an angle of spatula, a unit D for measuring an angle of fall and a unit E for measuring packed bulk density. The respective units will be described in detail.

FIG. 4 represents an arrangement, corresponding to the unit A, for use in measurement of an angle of repose. A pile of a pressing cylinder 1, a cylindrical sieve 2 having a metal mesh 3 and a funnel 4 are fixed by a set of fixtures 10, 11 and 12 on a vibratory base plate 7 which is driven in vibration by a vibrating mechanism (not shown) in the table. Under this unit, a horizontal circular disc 5 is placed coaxially with said unit. The numeral 6 indicates an inclination measuring apparatus comprising a protractor 8, a horizontal rod 9 having a pointer 15 and supporting the protractor 8 at the center 14 thereof, a vertical rod 13 and a coupling block 22. Geometries of the unit are for example such that the mesh 3 of the sieve 2 is of No. 24 and the diameter of the horizontal circular disc 5 is about 80 millimeters.

In operation, a material to be tested is put on the mesh 3 of the sieve 2 and the sieve assembly is vibrated. Thus, the material passes the mesh 3, be collected by the funnel 4 and falls on the circular disc 5 to form a conical heap as shown in the drawing. Then, a chord 21 of the protractor 8 is placed along the generated cone and the angle is read by the pointer 15. This angle which is formed by the generated cone with respect to the horizontal plane is referred to as "angle of repose."

FIGS. 5 and 6 represent an arrangement, corresponding to the unit C, for use in measurement of an angle of spatula. This unit comprises a material receptacle 16 which is held so as to be movable vertically, and a horizontal flat spatula 17 having a specific width, which is for example 22 millimeters wide and 130 millimeters long. The receptacle 16 is placed on a bed 23 which is held by a cylinder 24 which is slidably inserted in a pipe 25 fixed to the device table 29. The lower end of the cylinder 24 is tapered and a tapered collective chuck member 30 is detachable fitted thereon. The chuck member 30 is coupled to an acting rod 38 which is urged upwards by a spring 27 with respect to the cylinder 24 and by a spring 28 with respect to the pipe 25, and the table 29. Thus, in normal conditions, the cylinder 24 is urged to fit with the chuck member 30 and supported at any height by friction of the member 30 with the cylinder wall.

The top of the acting rod 38 contacts with a semicircular portion of a rod 44 which can be rotated by rotating a knob 20 attached thereto. If the knob 20 is rotated to rotate the rod 44, the acting rod 38 is pushed down by the semicircular portion of the rod 44 to release the chuck member 30 from the cylinder 24. Thus the cylinder 24 becomes freely movable in the pipe 25 and the receptacle bed 23 can be moved up and down by hand. If the knob 20 is released, it is urged back to the initial normal state by a spring 26 and the receptacle 16 is fixed at that position.

The spatula 17 is supported by an arm 53 fixed to a rod 18 which is slidably fitted in a cylinder 19 fixed to the device table 29. The rod 18 has a flange 58 and a shock absorbing seat 60 is placed between the flange 58 and the cylinder 19. At the top of the rod 18 there is a vertical rod 57 having a weight 55 slidably fitted thereon and a stopper 49 therefor. The numeral 6 indicates an inclination measuring apparatus which is the same as that used for measurement of the angle of repose.

In operation, the material receptacle 16 is lifted until the bottom face of the spatula 17 becomes in contact with the bottom of the receptacle 16, and is fixed in place. Material to be tested is heaped upon and around the spatula 17 and then the receptacle 16 is drawn down. Then, the angle of inclination of the side face of the ridge of the material on the spatula 17 with respect to the horizontal plane is measured by the inclination measuring apparatus 6. Next, the weight 55 is lifted by hand to the uppermost position 55' and caused to freely fall down to give a shock to the spatula 17. Thereafter, the angle of inclination is measured again. The arithmetic mean of the both angles of inclination is referred to as "angle of spatula." In the instant embodiment of the invention the weight 55 is 110 grams and the height of fall is 158 millimeters.

FIG. 7 shows an arrangement which corresponds to the unit A but is used for measurement of aerated bulk density. The vibrating sieve assembly of this arrangement is quite similar to that of FIG. 4 except that the cones 31 and 32 are provided to prevent scattering of powdered material. A specific cup 33 having a volume of 100 milliliters for example is placed just under the sieve assembly.

In operation, material to be tested is placed in the sieve and the sieve assembly is vibrated causing the material to fall into the cup 33. After excessive material above the cup edge is removed, the material in the cup is weighed. This weight of material divided by the volume of the cup 33 is referred to as "aerated bulk density."

Figure 8:
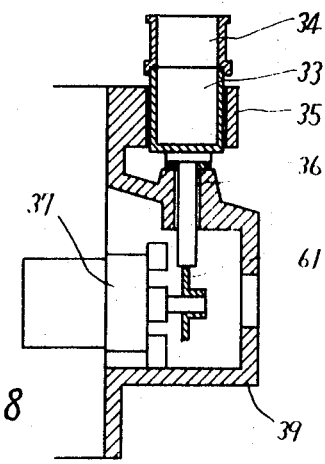
FIG. 8 is a side view in partial section illustrating a packed bulk density measuring unit of the device in accordance with the invention.

FIG. 8 shows an arrangement corresponding to the unit E used for measurement of packed bulk density. A cup 33 which is the same as that shown in FIG. 7 is put on a tapping rod 36 supported so as to move vertically. The rod 36 can be vibrated vertically by a cam 61 and a motor 37. This vibration has a frequency of about 1 cycle per second and amplitude of about 18 millimeters. A cylinder 34 is detachably joined to the cup 33. The cup assembly is loosely held by a holder 35 which is fixed to the device table 29.

In operation, material to be tested is put in the cup 33 joined with the cylinder 34, and the tapping rod 36 is driven for a predetermined time, such as three minutes. Then, the cylinder 34 is removed together with the excessive amount of the material about the cup edge, and the material in the cup 33 is weighed. The density thus obtained is referred to as "packed bulk density."

Figure 9:
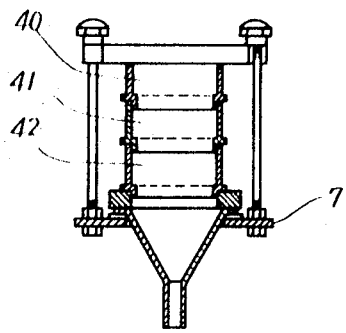
FIG. 9 is a front view in partial section illustrating a cohesiveness measuring unit of the device according to this invention.

FIG. 9 shows an arrangement which corresponds to the unit A but is somewhat modified from that shown in FIG. 4. Three sieves 40, 41, and 42 of Nos. 60, 100 and 200, respectively, are positioned on the vibratory base plate 7.

In operation, 2 grams of material to be tested, which has been sifted through No. 200 sieve, is put in the uppermost sieve 40 and the sieve assembly is vibrated for a predetermined time. This time is determined based upon dynamic bulk density of the material. The dynamic bulk density of the material can be obtained from the following equation:

$$W = (P - A)C + A$$

where $W$ is the dynamic bulk density, $P$ is the packed bulk density, $A$ is the aerated bulk density and $C$ is a compressive factor represented by an equation:

$$C = (P - A)/P$$

The above sifting time is selected to be 20 seconds when $W$ is equal to or greater than 1.6 and when $W$ is less than 1.6 the time is increased one second for each increment of 0.16 below 1.6. After the end of this time, the amounts remaining on the three sieves are individually weighed. When these weights of material remaining on the sieves 40, 41, and 42 are X, Y, and Z grams, respectively, "cohesiveness" is defined as follows:

$$\text{Cohesiveness} = (50X + 30Y + 10Z)\%$$

It is well known in the art that the factors measured by the above mentioned arrangements, such as angle of repose, angle of spatula, aerated bulk density, packed bulk density, compressive factor and cohesiveness, are those which determine "flowability" of the material. The following arrangements are used for measuring "floodability" of the material.

Figure 10:
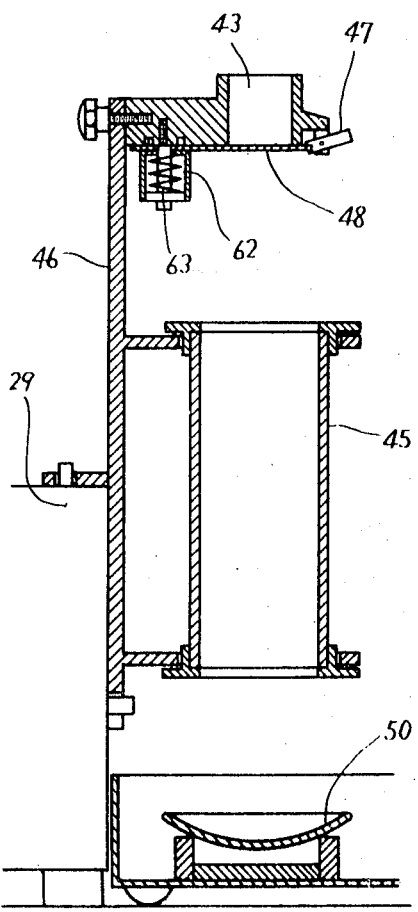
FIG. 10 is a side view in partial section illustrating a dispersability measuring unit of the device according to this invention.
Figure 11:
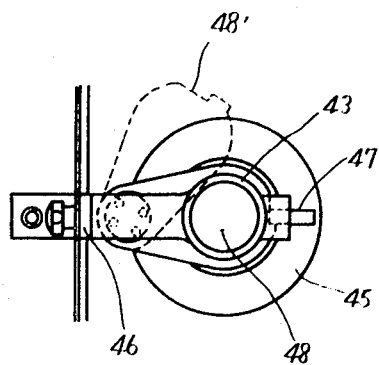
FIG. 11 is a plan view of the unit of FIG. 10.

FIGS. 10 and 11 show an arrangement corresponding to the unit B, for measuring dispersability. A material container 43 is supported on a supporting member 46 which is fixed to the device table 29. The bottom plate 48 of the container 43 is pivoted by a pin 63 and urged laterally by a spring 62 so that if the plate 48 is released from the catch 47, it quickly opens to the position shown by a dotted line 43'. Under the container 43, a hollow cylinder 45 for preventing dispersion of the material is fixed to the supporting member 46. A specific receptacle 50 is placed beneath the hollow cylinder 45. The distance between the container 43 to the receptacle 50 is about 610 millimeters for example.

In operation, 10 grams of material to be tested is put in the container 43 and the bottom plate 48 is opened. The material falls freely through the hollow cylinder 45 onto the receptacle 50. If the material remaining on the receptacle 50 is weighed, the "dispersability" is defined as a ratio of this weight with respect to 10 grams.

Figure 12:
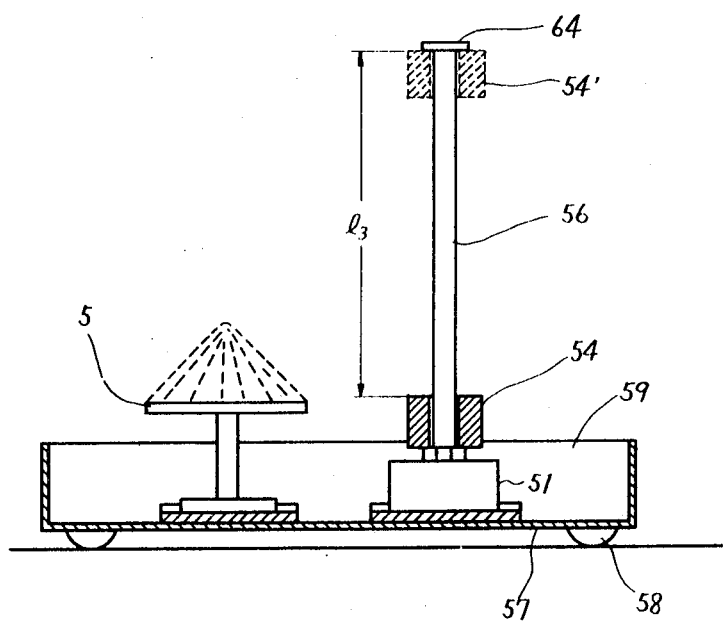
FIG. 12 is a side view in partial section illustrating an angle of fall measuring unit of the device according to this invention.

FIG. 12 shows an arrangement corresponding to the unit D for measuring angle of fall. The arrangement includes a shocking device having a vertical column 56 on which a weight 54 is slidably fitted and a base block 51. The top of the column 56 carries a stop 64. The maximum distance of fall of the weight is about 158 millimeters and the weight of the weight 54 is about 110 grams. The shocking device is placed in a flat container 59 having a bottom plate 57 which supported by short legs 58 on the floor. The container 59 also includes a circular disc 5 which is the same as that shown in FIG. 4.

In operation a conical heap of material to be tested is formed and the angle of repose is measured in the same manner as described in connection with FIG. 4. Thereafter, the weight 54 is drawn up along the column 56 until it reaches the stop 64 an then allowed to freely fall. The angle of inclination of the conical heap of material which has been thus reduced is then measured. This angle of inclination is referred to as "angle of fall," and the difference between the angle of repose and the angle of fall is a measure of floodability of the material.

The device according to this invention further includes switches, electric and mechanical controls and timing devices which are coupled to the respective measuring units for convenience of measurement. According to this inventive device, measurement of flowability and floodability of powdered or granular material can be performed simply with minimum personal error.

What is claimed is:

1. A device for measuring characteristics of powdered and granular materials, characterized by provision in combination of an angle of repose, cohesiveness and aerated bulk density measuring unit including a vibratory base plate, a plurality of sieves to be selectively attached to said base plate and a horizontal circular disc plate and a cup for receiving said materials passing said sieves, a packed bulk density measuring unit including a tapping mechanism for tapping said cup to tighten said materials, an angle of spatula measuring unit including a horizontal rectangular plate and a material container at least one of which is movable vertically with respect to the other, a dispersability measuring unit including a material container having a quickly openable bottom plate and a receptacle placed under said container for receiving said materials falling therefrom, and an angle of fall measuring unit including said circular disc plate and a weight to be let fall near said circular disc plate from a predetermined height.

* * * * *